United States Patent [19]

Fling

[11] Patent Number: 4,717,951
[45] Date of Patent: Jan. 5, 1988

[54] ADAPTIVE DIGITAL FILTER

[75] Inventor: Russell T. Fling, Fishers, Ind.

[73] Assignee: RCA Corporation, Princeton, N.J.

[21] Appl. No.: 793,147

[22] Filed: Oct. 31, 1985

[51] Int. Cl.$^4$ .......................................... H04N 5/262
[52] U.S. Cl. ..................................... 358/22; 358/167; 364/724
[58] Field of Search ............... 358/22, 160, 183, 21 R, 358/167, 31, 149, 36; 364/724; 328/167; 307/520, 521; 333/166

[56] References Cited

U.S. PATENT DOCUMENTS

| | | | |
|---|---|---|---|
| 4,218,705 | 8/1980 | Inaba et al. | 358/149 |
| 4,282,546 | 8/1981 | Reitmeier | 358/22 |
| 4,298,891 | 11/1981 | Baba et al. | 358/183 |
| 4,352,162 | 9/1982 | Nyuji et al. | 364/724 |
| 4,488,251 | 12/1984 | Wischermann | 364/724 |
| 4,602,285 | 7/1986 | Beaulier et al. | 358/22 |

FOREIGN PATENT DOCUMENTS

| | | |
|---|---|---|
| 0105998 | 4/1984 | European Pat. Off. . |
| 0125649 | 11/1984 | European Pat. Off. . |
| 2126453 | 3/1984 | United Kingdom . |
| 2127250 | 4/1984 | United Kingdom . |
| 2150381A | 6/1985 | United Kingdom . |

OTHER PUBLICATIONS

L. R. Rabiner et al., Digital Processing of Speech Signals, Prentice-Hall, Inc., Englewood Cliffs, N.J., 1978, pp. 10-31.

Primary Examiner—Tommy P. Chin
Assistant Examiner—David E. Harvey
Attorney, Agent, or Firm—Paul J. Rasmussen; Eric P. Herrmann; Kenneth N. Nigon

[57] ABSTRACT

A picture-in-picture television receiver for which the viewer may change the size of the inset image includes an adaptive anti-aliasing filter. Composite video signals which produce the inset image are applied to a separation filter which attenuates the chrominance components to provide separated luminance signals. The luminance signals are applied to a second filter which includes a variable delay element and an adder. The luminance signals are applied to one input port of the adder and to the delay element. The signals provided by the delay element are applied to the second input port of the adder. The delay element provides time delays which may be expressed by the equation $T=K_2\tau + PK_1\tau$ where $\tau$ is a fixed amount of time, $K_1$ and $K_2$ are constants and $P$ is a variable. The frequency response characteristic of the filter is changed by changing the value of $P$.

6 Claims, 8 Drawing Figures

ADAPTIVE DIGITAL FILTER

The present invention relates to digital electronic signal processing filters having frequency response characteristics which may be adapted to exhibit more than one pass-band bandwidth.

Adaptive digital filters are useful in many applications in which the signals of interest may occupy bands of frequencies having successively narrower (or wider) bandwidths. One such application is in a picture-in-picture (PIP) television receiver for which the viewer may change the size of the inset image.

In a PIP system, two images, which may originate from possibly unrelated sources, are displayed simultaneously as one image. The composite picture includes a full size primary image and a reduced size secondary image, displayed as an inset in the primary image. In a typical PIP system, the signal which produces the secondary image is sampled using a sampling clock signal having a frequency, $4f_{sc}$, that is, four times the frequency of the color subcarrier, $f_c$. These samples are then separated into samples representing a baseband luminance signal and samples representing two quadrature phase related baseband color difference signals. Both the sampled luminance and color difference signals are subsampled in a ratio of, for example, three-to-one to produce luminance and color difference signal samples representing a reduced-size image. Samples representing one field of the reduced-size image are written into a memory as they are produced and read from the memory for display in synchronism with the horizontal and vertical synchronizing pulses of the primary signal.

For all major video signal standards (i.e. NTSC, PAL and SECAM) the initial sampling at $4f_c$ satisfies the Nyquist criterion. In other words, the highest frequency component of the composite video signal is less than one-half of the sampling frequency. However, when the separated signals are subsampled to produce the reduced-size image, the Nyquist criterion may not be met. If this criterion is not met, the reduced-size image produced by these samples may appear distorted. This distortion occurs when components of the video signals having frequencies greater than one-half of the subsampling frequency are folded back into the frequency spectrum of the subsampled signal. Distortion of this type is called aliasing distortion. One way to reduce aliasing distortion is to filter the sampled luminance and color difference signals—to substantially remove components having frequencies greater than one-half of the subsampling frequency—before the signals are subsampled. The filters which remove the components of the signal that may cause aliasing distortion are called anti-aliasing filters.

A PIP display system which uses a single subsampling ratio may use a fixed anti-aliasing filter. However, a display device of this sort cannot accurately provide inset images having more than one size. If the subsampling ratio is greater than the reduction ratio, the inset secondary image may appear blurred. If the subsampling ratio is smaller than the reduction ratio, the inset image may have aliasing distortion.

Generally it is desirable for a PIP receiver to provide inset images having more than one level of resolution and more than one size. This allows the viewer to adjust the size of the secondary image to conform to the relative importance of the secondary program or to more accurately reproduce detailed objects in the secondary image. Thus, it is desirable, for accurate image reproduction, to use a different anti-aliasing filter characteristic for each of the different subsampling rates.

SUMMARY OF THE INVENTION

The present invention is embodied in an digital filtering system having an adaptive frequency characteristic. The filtering system includes a filter which has an input port, a variable delay element and arithmetic circuitry that combines delayed signals with the signals applied to the input port to produce filtered output signals. The amount of time by which the variable delay element delays signals applied to the input port, may be represented by the equation $T = K_2 \tau + P K_1 \tau$. Where $\tau$ is a predetermined time period, $K_2$ is a predetermined integer value greater than or equal to zero, $K_1$ is a predetermined integer value greater than zero and P is a variable integer value greater than or equal to zero. The frequency characteristics of this filter may be changed by changing the value of P.

DETAILED DESCRIPTION OF THE INVENTION

Figure 1:
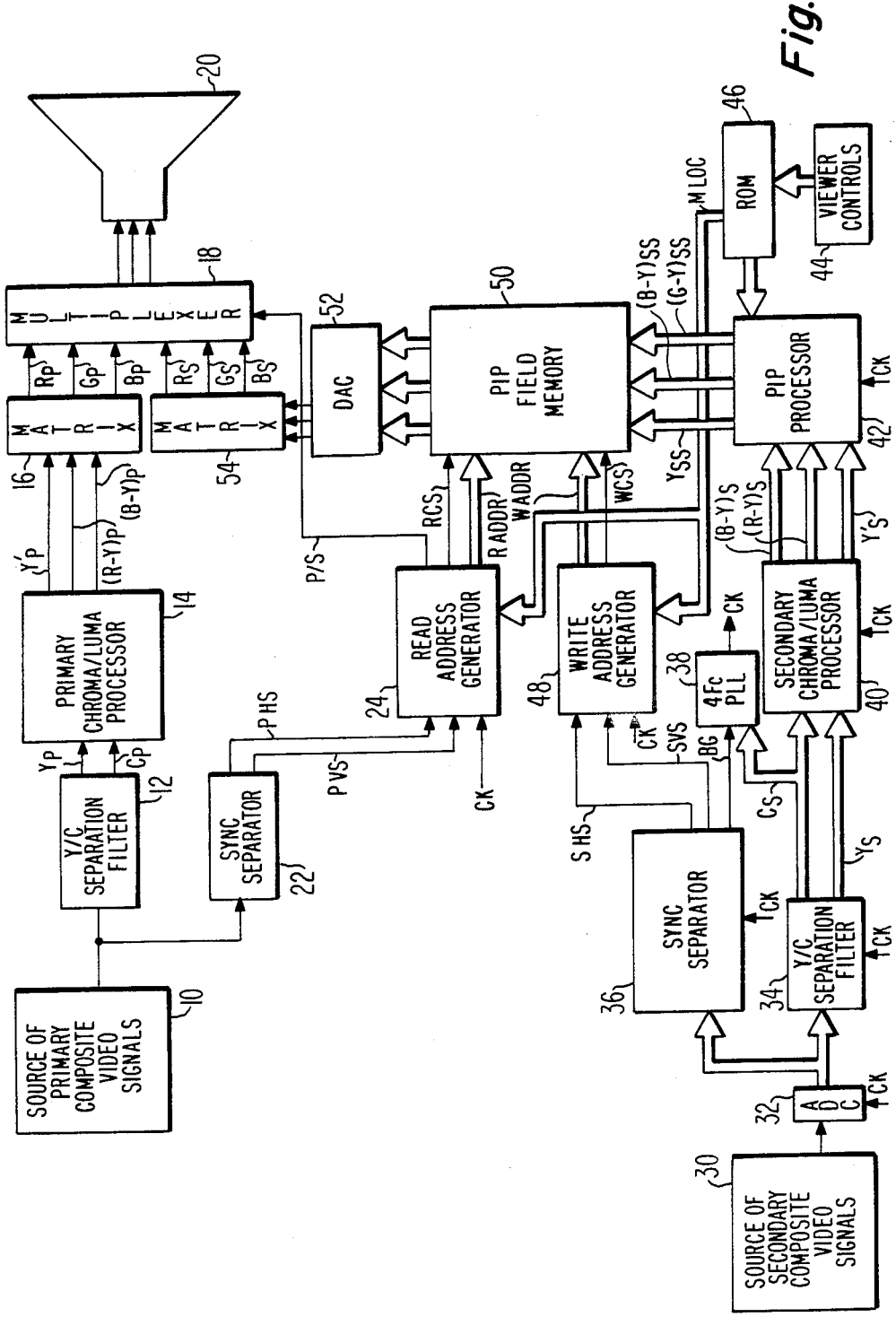
FIG. 1 is a block diagram of a PIP display device which includes an embodiment of the present invention.

In the drawings, broad arrows represent busses for multiple-bit parallel digital signals and line arrows represent connections carrying analog signals or single bit digital signals. Depending on the processing speed of the devices, compensating delays may be required in certain of the signal paths. One skilled in the art of digital signal processing circuit design would know where such delays would be needed in a particular system.

FIG. 1 is a block diagram of a PIP display device in which the primary signal is processed using conventional analog apparatus and the secondary signal is processed digitally.

A source of primary composite video signals 10 applies primary video signals to a Y/C separation filter 12 and to a sync separator 22. The sync separator 22, which may be a conventional analog circuit, extracts the horizontal synchronization signal, PHS, and the vertical synchronization signal, PVS, from the primary composite video signals.

Y/C separation filter 12, which may include conventional low-pass and high-pass filters, separates the composite video signals into primary luminance signals, $Y_p$, and primary chrominance signals, $C_p$. The primary luminance and chrominance signals are applied to a primary chroma/luma processor 14 which may include, for example, band-shaping filters for peaking the high frequency components of the luminance signals to develop a peaked luminance signal $Y_p'$ and a chrominance signal demodulator for deriving the baseband color difference signals $(R-Y)_p$ and $(B-Y)_p$ from the primary chrominance signals, $C_p$. The signals $Y_p'$, $(R-Y)_p$ and $(B-Y)_p$ are applied to a matrix 16 which combines the signals to develop the red, green and blue color signals $R_p$, $G_p$ and $B_p$ respectively. These color signals are applied to one set of signal input terminals of an analog multiplexer 18, the output signals of the multiplexer 18 drive a cathode ray tube (CRT) 20. The secondary red, green and blue color signals ($R_S$, $G_S$ and $B_S$) are applied to a second set of signal input terminals of the multiplexer 18. These signals are developed by the apparatus described below.

A source of secondary composite video signals 30, which may include the tuner, IF amplifier and video detector of a conventional color television receiver, provides secondary composite video signals to an analog-to-digital converter (ADC) 32. ADC 32 samples and digitizes the secondary composite video signals at instants determined by the sampling clock signal CK. The signal CK is generated by a phase-locked loop (PLL) 38 described below.

Digitized secondary video signals from ADC 32 are applied to a sync separator 36. Sync separator 36 may, for example, include circuitry to separate the vertical and horizontal synchronizing signal components, SVS and SHS respectively, from the secondary composite video signals and circuitry to develop a burst gate signal, BG.

Figure 2:
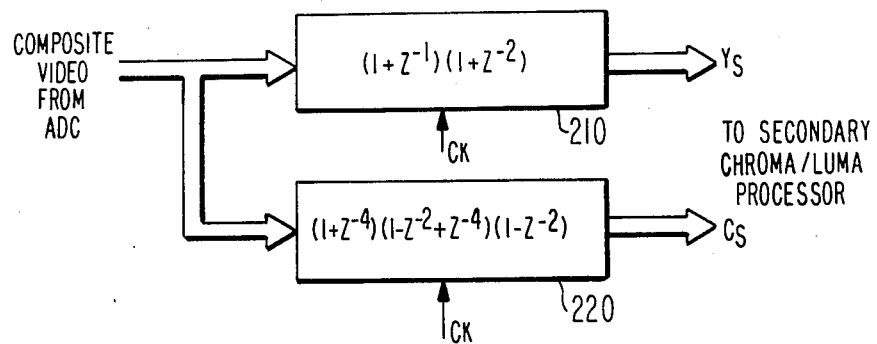
FIG. 2 is a block diagram of a Y/C separation filter suitable for use in the display apparatus shown in FIG. 1.

ADC 32 also provides digitized secondary video signals to a Y/C separation filter 34. FIG. 2 is a block diagram of an exemplary Y/C separation filter. Secondary composite video signals are applied to a chroma trap filter 210 and to a chroma bandpass filter 220. The filters 210 and 220 may, for example, be conventional finite impulse response (FIR) filters which are clocked by the signal CK. In the exemplary embodiment, the filters 210 and 220 have the respective transfer functions $$T_{210}=(1+Z^{-1})(1+Z^{-2})$$

and $$T_{220}=(1+Z^{-4})(1-Z^{-2}+Z^{-4})(1-Z^{-2})$$

expressed in Z transform notation.

The transfer function of filter 210, $T_{210}$, corresponds to a frequency response characteristic having a rejection band that is centered about $f_c$ and having sufficient bandwidth to substantially remove the chrominance signal components of a composite video signal. Consequently, the filter 210 provides a digital signal $Y_S$ which represent the luminance components of the secondary composite video signal.

The transfer function of filter 220, $T_{220}$, corresponds to a frequency response characteristic having a passband that is centered about $f_c$ and that encompasses that portion of the frequency spectrum of a composite video signal occupied by the chrominance signal components. The signal, $C_S$, provided by filter 220 represents the chrominance components of the secondary composite video signals.

The chrominance signal, $C_S$, from Y/C separation filter 34 and the burst gate signal, BG, from the sync separator 36 are applied to the PLL 38. PLL 38, may be, for example, a digital phase-locked-loop similar to that described in U.S. Pat. No. 4,291,332 entitled "Phase Locked Circuit" which is hereby incorporated by reference. PLL 38 produces a clock signal, CK, which has a frequency of $4f_c$ and which is locked in phase to the color synchronizing burst component of the secondary video signal.

The secondary luminance signal, $Y_S$, and chrominance signal, $C_S$, are applied to the secondary chroma/luma processor 40. Processor 40 may include, for example, an FIR band shaping filter for peaking the higher frequency components of the digital luminance signals to provide a modified secondary luminance signal $Y_S'$. Processor 40 may also include a digital chrominance signal demodulator for developing samples which represent the baseband secondary color difference signals $(R-Y)_S$ and $(B-Y)_S$ from the digital chrominance signals $C_S$. In the present embodiment, the chroma/luma processor 40 provides luminance samples at a sampling frequency equal to the frequency of the clock signal CK, but provides color difference samples at one-fourth that frequency.

Figure 3:
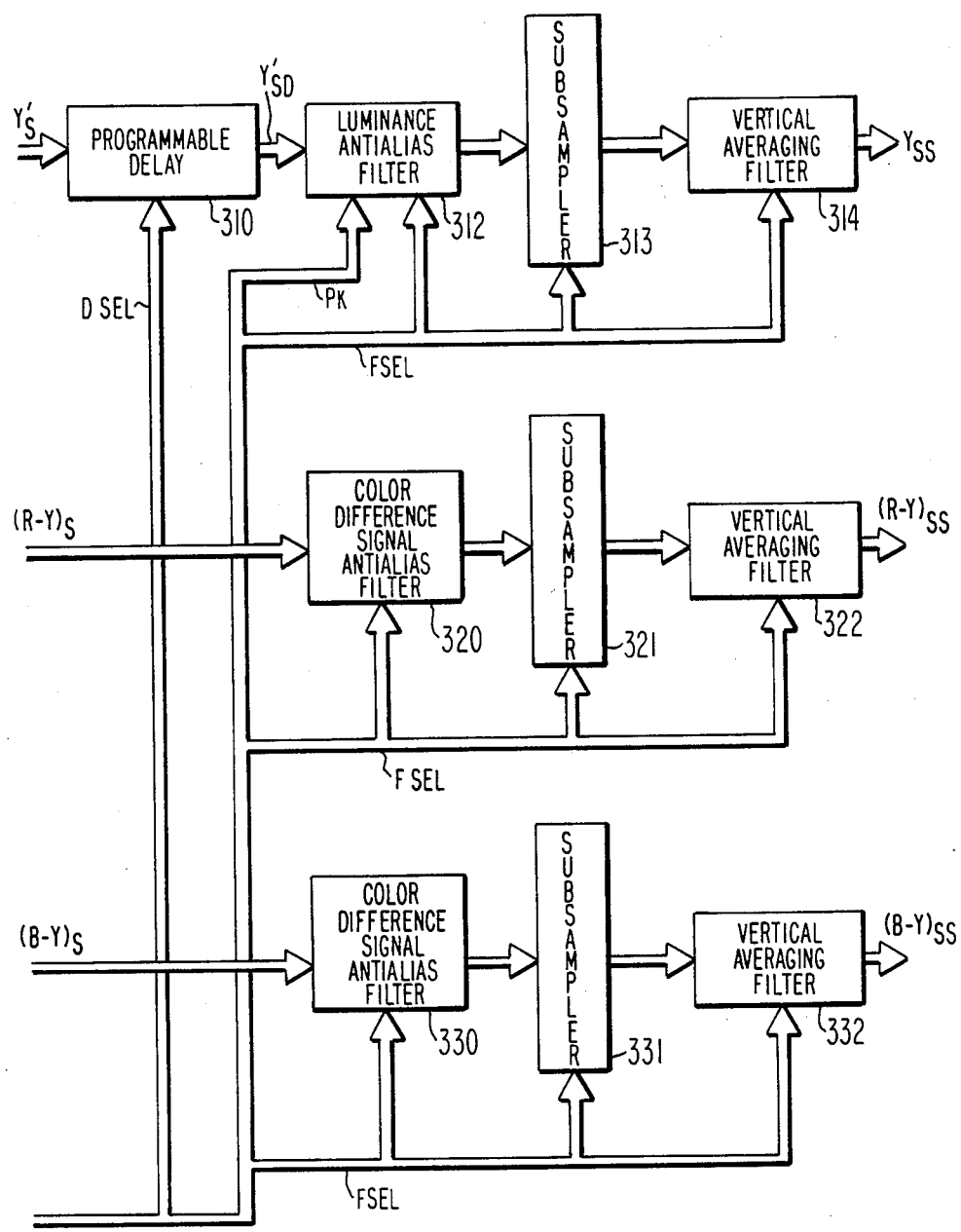
FIG. 3 is a block diagram of a PIP processor suitable for use in the display apparatus shown in FIG. 1.

The signals $Y_S'$, $(R-Y)_S$ and $(B-Y)_S$ are applied to a PIP processor 42 where they are filtered and subsampled to develop samples representing a reduced-size image. In FIG. 3, the luminance signals, $Y_S'$, are applied to a programmable delay element 310 which equalizes the delay in the luminance signal processing channel to match the delays of the color difference signal processing channels, described below. The signals, $Y_{SD}'$, provided by delay element 310 are applied to a luminance antialiasing filter 312 which reduces the bandwidth of the frequency spectrum of the luminance signal. The signals provided by the filter 312 may be subsampled by subsampler 313 according to the chosen reduction ratio without introducing undesirable aliasing distortion. The subsampled luminance signal is applied to a vertical averaging filter 314 which averages a number of successive lines of video signal to reduce the number of lines in the inset image in accordance with the chosen reduction ratio.

Each of the color difference signals $(R-Y)_S$ and $(B-Y)_S$ is applied to a color difference signal anti-aliasing filter, 320 and 330 respectively, to a subsampler, 321 and 322 respectively and to a vertical anti-aliasing filter, 322 and 332 respectively. As with the luminance signal processing circuitry, the anti-aliasing filters in the color difference signal processing circuitry reduce the bandwidth of the frequency spectrum of color difference signals so they may be subsampled by the subsamplers according to the chosen reduction ratio. The vertical averaging filters average a number of successive lines sufficient to match the vertical resolution of the image to its reduced horizontal resolution.

In the PIP display system shown in FIG. 1, the viewer may change the reduction ratio to change the size of the inset image via the viewer controls 44. The image size value chosen by the viewer is applied to a read-only memory (ROM) 46 which provides signals DSEL, FSEL and PK to the PIP processor 42. These signals change the processing delay through the PIP processor, the frequency response characteristics of the anti-aliasing filters 312, 320 and 330, the subsampling ratio used by the subsamplers 313, 321 and 331 and the number of lines averaged by the vertical averaging filters 314, 322 and 332. The structure and operation of this circuitry is described below.

Figure 4:
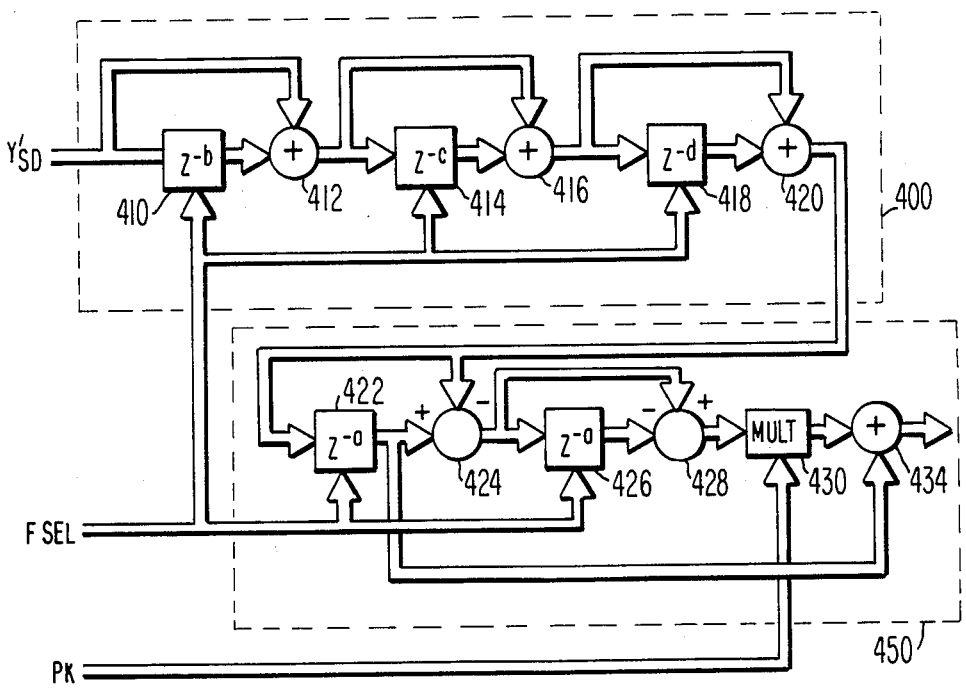
FIG. 4 is a block diagram of a luminance anti-aliasing filter suitable for use in the PIP processor shown in FIG. 3.

FIG. 4 is a block diagram of a luminance anti-aliasing filter 312 suitable for use in the PIP processor shown in FIG. 3. This filter includes a variable bandwidth low-pass filter 400 and a variable peaking filter 450. The filter 400 is a combination of three series connected band rejection filters. Each of the filters includes a variable delay element, 410, 414 and 418 respectively, and an adder 412, 416 and 420 respectively. In the first band-rejection filter, samples, $Y_{SD}'$, from the programmable delay element 310 are applied to the input port of the variable delay element 410 and to one input port of the adder 412. Delayed samples from the output port of the delay element 410 are applied to the other input port of the adder 412. The output port of adder 412 is connected to the delay element 414 which is the input port of the second band-rejection filter. The delay element 414 and adder 416 are in the same configuration as the delay element 410 and adder 412 described above. The output port of the adder 416 is connected to the delay element 418 which is the input port of the third band-rejection filter. Delay element 418 and adder 420 are connected similarly to the delay elements 410 and 414 and adders 412 and 416 of the respective first and second band-rejection filters. The signal provided by the adder 420 is the output signal of the filter 400. This signal is applied to a variable delay element 422 which is the input port of the variable peaking filter 450. The samples provided by the adder 420 are subtracted from the delayed samples provided by the delay elements 422 in the subtracter 424. The output port of the subtracter 424 is connected to the input port of a variable delay element 426 and to one input port of a subtracter 428. Subtracter 428 subtracts the samples provided by the delay element 426 from the samples provided by the subtracter 424 and applies the resultant samples to a multiplier 430. Multiplier 430, which may, for example, be a programmable shifter, scales the samples provided by subtracter 428 by a peaking scale factor, PK, supplied by the ROM 46. ROM 46 is addressed by the viewer controls 44 to provide peaking scale factors consistent with the viewer's preference for detail in the inset image. In the embodiment shown in FIG. 4, the scale factor PK may have values of $\frac{1}{8}$, $\frac{1}{4}$, $\frac{1}{2}$ or 1. The samples provided by the multiplier 430 are applied to one input port of an adder 434, the other input port of which is coupled to receive samples provided by the delay element 422. The samples provided by the adder 434 are the output samples of the luminance antialiasing filter 312.

The frequency response characteristics of the filters 400 and 450 are changed by changing the amount of time by which the delay elements 410, 414, 418, 422 and 426 delay the signals applied to their input ports. In FIG. 4, the delay provided by each of these elements is represented in Z transform notation as $Z^{-x}$, x being a respectively different variable integer value for each of the delay elements, i.e. "a" for delay elements 422 and 426, "b" for delay element 410, "c" for delay element 414 and "d" for delay element 418. The value of this variable is controlled by the filter select signal FSEL provided by the ROM 46. Table I shows the values of FSEL and of the variables a, b, c and d, as a function of the reduction ratio used to compress the secondary image.

TABLE I

| Reduction Ratio | FSEL | a | b | c | d |
|---|---|---|---|---|---|
| 1/2 | 0 | 4 | 0 | 1 | 0 |
| 1/3 | 1 | 6 | 2 | 2 | 1 |
| 1/4 | 2 | 8 | 4 | 3 | 2 |
| 1/5 | 3 | 10 | 6 | 4 | 3 |

Transfer functions $T_{400}$ and $T_{450}$, representing the frequency response characteristics of the anti-aliasing filter 400 and the peaking filter 450 respectively, may be developed from the delay values listed in Table I. These transfer functions are set forth in Table II.

TABLE II

| Reduction Ratio | $T_{400}$ | $T_{450}$ |
|---|---|---|
| 1/2 | $4(1 + Z^{-1})$ | $Z^{-4} + PK$ $(-1 + 2Z^{-4} - Z^{-8})$ |
| 1/3 | $(1 + Z^{-1})(1 + Z^{-2})^2$ | $Z^{-6} + PK$ $(-1 + 2Z^{-6} - Z^{-12})$ |
| 1/4 | $(1 + Z^{-2})(1 + Z^{-3})$ $(1 + Z^{-4})$ | $Z^{-8} + PK$ $(-1 + 2Z^{-8} - Z^{-16})$ |
| 1/5 | $(1 + Z^{-3})(1 + Z^{-4})$ $(1 + Z^{-6})$ | $Z^{-10} + PK$ $(-1 + 2Z^{-10} - Z^{-20})$ |

Figure 7:
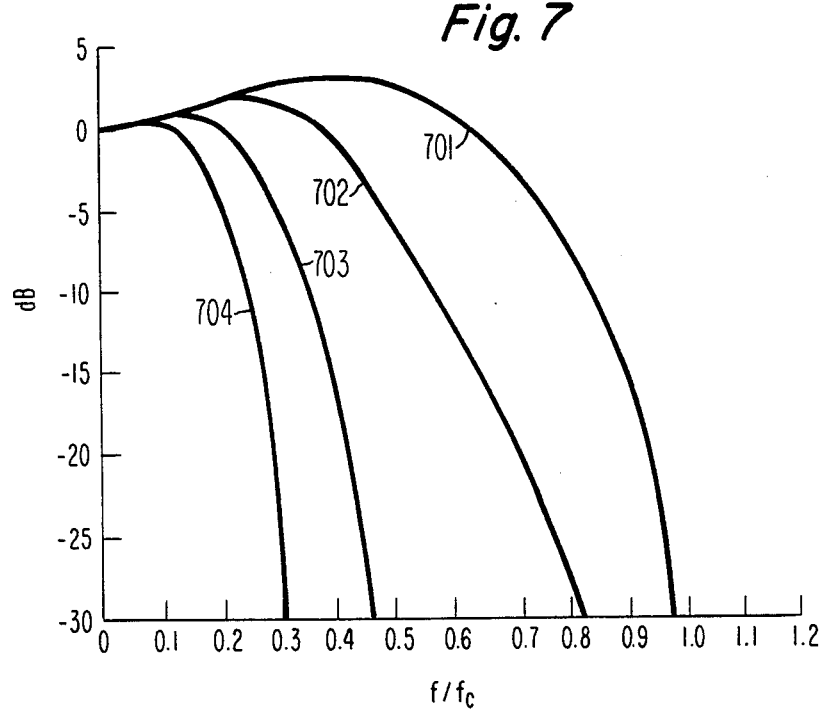

The frequency response characteristic to which the secondary luminance signals are subject is the combination of the characteristics of the filter 210, described above in reference to FIG. 2, and the filters 400 and 450. FIG. 7 is a set of frequency response curves; 701, 702, 703 and 704; which represent the characteristic responses of the composite filtering system for reduction ratios of one-half, one-third, one-fourth and one-fifth respectively. A value of one-eighth is used for the peaking scale factor, PK, in all of these curves and the effect of any signal peaking by the secondary chroma/luma processor 40 is ignored. Since the secondary luminance signal has a sampling frequency substantially equal to $4f_c$. The effective sampling frequencies of the signal reduced by one-half, one-third, one-fourth and one-fifth are $2f_c$, $4f_c/3$, $f_c$ and $4f_c/5$. It is noted that the filters represented by the respective frequency response characteristic curves 701 through 704 attenuate luminance signal components having frequencies greater than the Nyquist limit of one-half of the corresponding effective sampling frequencies. It is further noted that each of these frequency response curves has a single ripple in its passband. This characteristic has been found to be desirable for video signal processing applications. It is a feature of this filter design that the gain of the filter for frequencies in its passband is substantially equal for all of the frequency response characteristics. This feature is desirable to simplify the design of the circuitry which processes the signals produced by the filter.

Figure 5:
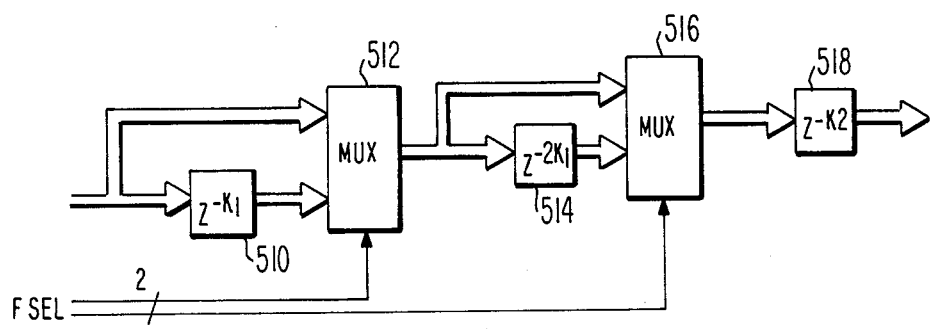
FIG. 5 is a block diagram of a variable delay device suitable for use in the anti-aliasing filter shown in FIG. 4.

As set forth above, the frequency response characteristics of the filters 400 and 450 are varied by changing the amount of delay provided by their respective delay elements. FIG. 5 is a block diagram of a variable delay element suitable for use in the filters 400 and 450. Samples are applied to a first data input port of a multiplexer 512 and to a fixed delay element 510. Delay element 510 delays the samples by an amount of time substantially equal to an integer $K_1$ periods of the system clock signal CK, and applies the delayed samples to a second data input port of the multiplexer 512. Multiplexer 512 is controlled by the less significant bit of the two bit filter select signal FSEL to provide undelayed samples when the bit is zero and delayed samples when it is one. The samples provided by the multiplexer 512 are applied to a first data input port of a multiplexer 516 and to a fixed delay element 514. Delay element 514 delays the samples applied to its input port by an amount of time substantially equal to two times $K_1$ periods of the clock signal CK. The samples provided by the delay element 514 are applied to the second data input part of the multiplexer 516. Multiplexer 516 is controlled by the more significant bit of the signal FSEL. The output port of the multiplexer 516 is connected to the input port of a fixed delay element 518 which delays the samples provided by the multiplexer 516 by an amount of time substantially equal to an integer $K_2$ periods of the clock signal CK. Table III lists the values of $K_1$ and $K_2$ for the different delay variables a, b, c and d.

TABLE III

| delay variable | $K_1$ | $K_2$ |
|---|---|---|
| a | 2 | 4 |
| b | 2 | 0 |
| c | 1 | 1 |
| d | 1 | 0 |

It is contemplated that the variable delay circuitry shown in FIG. 5 may be extended to provide programmable delays of from 0 to $(2^{N-1}K_1+K_2)T_{CK}$ where N is an arbitrary positive integer. The circuitry is extended by inserting $N-2$ additional stages, each containing a fixed delay element and a multiplexer (not shown), between the output port of the multiplexer 516 and the input port of the delay element 518. Each of these additional stages is configured identically to the delay element 510 and multiplexer 512 shown in FIG. 5. The delay element of each stage provides a time delay that is two times the time delay provided by the preceding stage and each multiplexer is controlled by a successively more significant bit of the digital control signal FSEL. In this extended configuration, the delay element 518 may include a clocked latch (not shown) having an asynchronous input port and a synchronous output port. This latch compensates for the incidental propagation delay through the multiplexers. Data applied to this latch is stored asynchronously as it is received but provided to the output port of the delay element in synchronism with the clock signal applied to the latch. By including a latch of this type in the fixed delay element 532, combined multiplexer propagation delays of up to one period of the clock signal applied to the latch may be tolerated.

Figure 6:
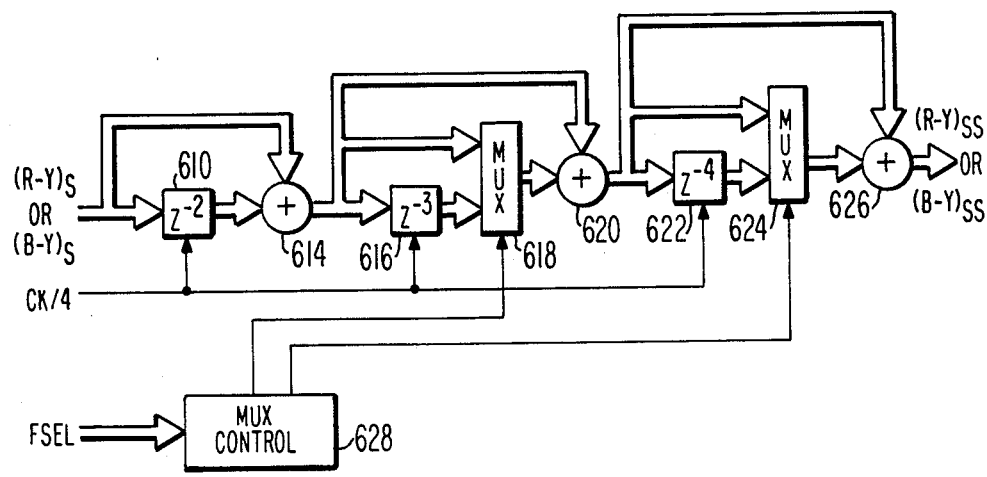
FIG. 6 is a block diagram of a color difference signal anti-aliasing filter suitable for use in the PIP processor shown in FIG. 4.

FIG. 6 is a block diagram of a color difference signal antialiasing filter which may be used for either the filter 320 or 330 described above in references to FIG. 3. In FIG. 6, the color difference signals from the chroma/luma processor 40 are applied to the delay element 610 and to the first input port of the adder 614. Signals from the delay element 610 are applied to the second input port of the adder 614. The output port of the adder 614 is connected to the input port of the second stage. In the second stage, the input signals are applied to the first input port of the adder 620, to the delay element 616 and to one signal input port of the multiplexer 618. The second signal input port of the multiplexer 618 is connected to the output port of the delay element 616. The output port of the multiplexer is connected to the second input port of the adder 620. The signals developed by the adder 620 are the input signals for the third stage. These signals are applied to the first input port of the adder 626, to the delay element 622 and to one input port of the multiplexer 624. The delay element 622 provides signals to the second signal input port of the multiplexer 624. The output port of multiplexer 624 is connected to the second input port of the adder 626. The samples provided at the output port of the adder 626 are the output samples of the color difference signal antialiasing filter. These samples are applied to the color difference signal vertical averaging filter 322 or 332 described below.

The delay elements 610, 616, and 622 are clocked by a signal CK/4 having a frequency, $f_c$, which is one-fourth of the frequency of the system clock signal CK. Delay elements 610, 616 and 622 provide samples that are delayed by an amount of time substantially equal to two three, and four periods of the signal CK/4, respectively.

The multiplexer control circuitry 628 controls the multiplexers 618 and 624 with two separate signals. A value of one for any of these control signals conditions the associated multiplexer to provide the delayed signal, and a value of zero conditions the multiplexer to provide the undelayed signal. The values of the various multiplexer control signals are determined by the filter select signal, FSEL, applied to the multiplexer control circuitry 628. The control signals for the multiplexers 618 and 624 have values of one when the value of the two-bit signal FSEL is greater than or equal to one and two, respectively. As the delay elements are switched into or out of the filter circuit, the transfer function and frequency response characteristic of the filter changes. The transfer functions, $T_{CD}$, in Z transform notation, for different values of the signal FSEL are set forth in Table IV.

TABLE IV

Figure 8:
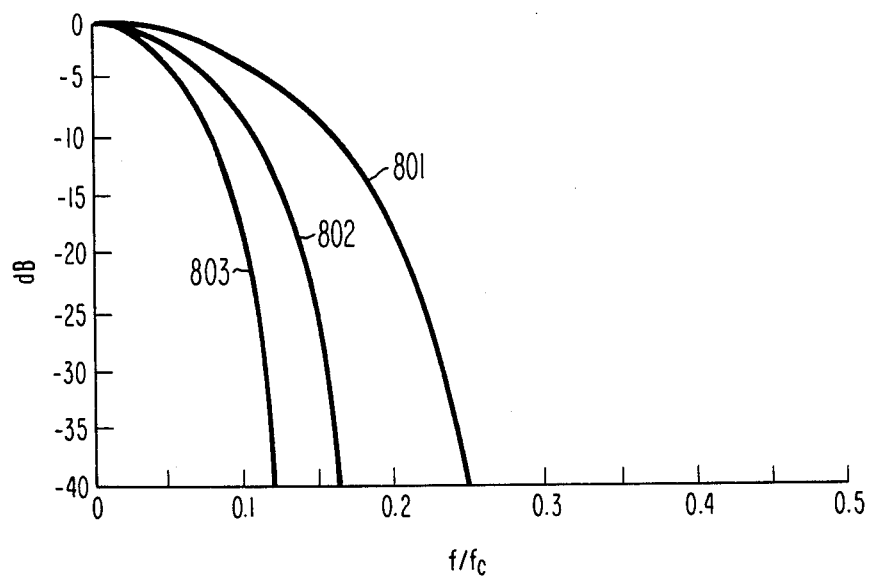
FIGS. 7 and 8 are graphs of frequency response characteristics that are useful in explaining the apparatus shown in FIGS. 1–6.

| FSEL | $T_{CD}$ |
|---|---|
| 0 | $4(1 + Z^{-2})$ |
| 1 | $2(1 + Z^{-2})(1 - Z^{-3})$ |
| 2 | $(1 + Z^{-2})(1 + Z^{-3})(1 + Z^{-4})$ |
| 3 | $(1 + Z^{-2})(1 + Z^{-3})(1 + Z^{-4})$ | the frequency response characteristic to which the color difference signals are subject is the combination of the characteristics of the color difference antialiasing filter 320 or 330 and the chroma band-pass filter 220 described in reference to FIG. 2. FIG. 8 is a set of frequency response curves; 801, 802 and 803; which represent the characteristic responses of the composite filtering system for reduction ratios of one-half, one-third and one-fourth or one-fifth respectively. As set fourth above in reference to the chroma/luma processor 40 of FIG. 1, the baseband color differences signals have an effective sampling frequency of $f_c$, one-fourth the frequency of the system clock signal CK. When the secondary image is reduced by factors of one-half, one-third, one-fourth and one-fifth the effective sampling frequency of the color difference signals becomes $f_c/2$, $f_c/3$, $f_c/4$ and $f_c/5$ respectively. It is noted that the filters represented by the respective frequency response curves 801 through 804 each attenuate components of the color difference signals having frequencies greater than the Nyquist limit of one-half of the corresponding effective sampling frequencies. It is further noted that the direct current (DC) gains of the filters represented by the different frequency response curves are substantially the same. This feature is desirable because it simplifies the design of the circuitry which processes the signals produced by the filter.

Referring once more to FIG. 3, the samples provided by the luminance and color difference signal averaging filters 312, 320, and 330 are applied to respective subsampling circuits 313, 321, and 331. Each of the subsampling circuits is controlled by the signal FSEL to subsample in a ratio of 1 to 2 when the value of FSEL is zero, 1 to 3 when FSEL is one, 1 to 4 when FSEL is two and 1 to 5 when FSEL is three. The samples developed by the subsampling circuits 313, 321, and 331 are applied to the respective vertical averaging filters 314, 322, and 332. Each of the vertical averaging filters averages the corresponding sample values of a number of lines determined by the signal FSEL to produce a line of composite samples. The samples from two lines are averages when FSEL is zero, from three lines when FSEL is one, from four lines when FSEL is two and from five lines when FSEL is three. The samples produced by the vertical averaging filters 314, 322 and 332 are the subsampled luminance signal, $Y_{SS}$, and the two subsampled color difference signals $(R-Y)_{SS}$ and $(B-Y)_{SS}$, respectively. The subsampling circuits, 313, 321 and 331, and the vertical averaging filters 314, 322, and 332 are not described in detail since they are not considered part of the present invention. Devices of this sort suitable for use with the circuitry described above may readily be built from generally available components by one skilled in the art of digital signal processing circuit design.

The signals $Y_{SS}$, $(R-Y)_{SS}$ and $(B-Y)_{SS}$ are applied to PIP field memory 50. Memory 50 may be a conventional random access memory having a sufficient number of storage cells to hold one field of the vertically and horizontally subsampled secondary signal. This memory may be organized as three separate field memories, one for the luminance signal and one for each of the two color differences signals, or it may be organized as a single field memory with the luminance and color difference signals combined into a single sampled signal. For example, these signals may be combined by alternately concatenating samples of the two color difference signals to samples of the luminance signal.

Data from the PIP processor 42 is written into the field memory 50 under control of the write address generator circuitry 48. The circuitry 48 develops write address signals, WADDR, and other control signals, WCS, as may be needed by the memory from the clock signal, CK, the secondary horizontal and vertical sync signals, SHS and SVS, respectively, and the memory location control signal, MLOC, provided by the ROM 46. The signal MLOC controls the range of memory addresses used for storing the reduced-size secondary image. In other words, the write address generator circuitry 48 develops memory addresses in synchronism with the signals CK, SHS and SVS. However, these addresses are used for writing data into the memory 50 only when they fall within the range specified by the signal MLOC.

Samples representing lines of the subsampled secondary image are read from the PIP field memory 50 under control of the read address generator circuitry 24. The signals applied to the circuitry 24 are the primary vertical and horizontal sync signals, PVS and PHS respectively, the clock signal, CK, and the memory location control signal, MLOC. The circuitry 24 may, for example, count pulses of the horizontal sync signal, PHS relative to the vertical sync pulses, PVS, and pulses of the signal CK relative to the primary horizontal sync pulses to generate addresses for the memory 50. When these addresses fall within the range specified by signal MLOC, the circuitry 24 may initiate read operations for the addresses and switch the multiplexer 18 via the control signal P/S to apply signals to the CRT 20 which are derived from the samples read from the memory 50.

The write address generator circuitry 48, read address generator 24 and PIP field memory 50 are not a part of the present invention and, so, are not described in detail. Exemplary circuits for storing and retrieving the signal from which the inset image is developed is described in the U.S. Pat. No. 4,249,213 entitled "Picture-in-Picture Television Receiver" and U.S. Pat. No. 4,139,860 entitled "Television Receiver Equipped for Simultaneously Showing Several Programs" which are hereby incorporated by reference.

The samples provided by the field memory 50 are applied to a digital to analog converter (DAC) 52 which develops analog luminance and color difference signals for application to a conventional analog matrix 54. The signals provided by the matrix 54 are the red, green and blue color signals $R_S$, $G_S$ and $B_S$ for the reduced-size secondary image. As set forth above, these signals are applied to the second set of signal input terminals of the analog multiplexer 18.

What is claimed is:

1. An adaptive filtering system for attenuating components of a sampled data input signal having frequencies within a selected band of frequencies relative to other components of said input signal having frequencies not within said selected band of frequencies, said adaptive filtering system comprising:
   a source of said sampled data input signal;
   a variable delay element for delaying the signals applied to the input terminal of said filter by an amount of time which may be represented by the equation $T_D = K_2\tau + PK_1\tau$, where $\tau$ is a predetermined time period, $K_2$ is a predetermined integer value greater than or equal to zero, $K_1$ is a predetermined integer value greater than zero and P is a digital signal the instantaneous value of which is greater than or equal to zero, said variable delay element including:
   a first delay element for delaying samples of said sampled input signal by a predetermined amount of time, $K_1\tau$;
   first signal switching means coupled to the source of sampled data input signal and to said first delay element and being controlled by a first control signal to selectively provide delayed samples from said first delay element or undelayed samples of said sampled data input signal;
   a second delay element for delaying the samples provided by said first signal switching means by an amount of time, $NK_1\tau$, where N is a positive integer;
   second signal switching means coupled to said first signal switching means and to said second delay element and being controlled by a second control signal to selectively provide the samples from said second delay element or the samples provided by said first signal switching means;
   means for developing said first control signal from a first bit of the digital signal P; and
   means for developing said second control signal from a second bit of the digital signal P, said second bit being different from said first bit;
   arithmetic circuitry for combining the signals provided by said variable delay element with the undelayed signals provided by said source to produce filtered output signals; and means coupled to said variable delay element for changing the value of the signal P to define said selected band of frequencies.

2. The adaptive filtering system set forth in claim 1 wherein said variable delay element further comprises:

a third delay element for delaying the samples provided by said second switching means by an amount of time substantially equal to $K_2\tau$ minus any signal propogation delay which may be associated with said first and second signal switching means.

3. In a video signal processing system including a source of sampled data video signal which may have component signals having frequencies greater than a predetermined frequency, means for developing a further sampled data video signal including means for subsampling said sampled data video signal using as a selected sampling frequency provided from a sampling frequency selecting means one of a plurality of predetermined subsampling frequencies wherein each of said subsampling frequencies is less than twice said predetermined frequency, means, coupled between said source and said means for developing said further sampled data video signal including means for attenuating components of said sampled data video signal having frequencies greater than one-half said selected sampling frequency, said means for attenuating comprising:

a first filter coupled to said source for attenuating said component signals having frequencies greater than said predetermined frequency relative to said component signals having frequencies less than said predetermined frequency;

a second filter coupled to said sampling frequency selecting means for attenuating components of the signals provided by said first filter having frequencies greater than one-half of said selected sampling frequency relative to components having frequencies less than one-half of said selected sampling frequency, said second filter including:

a variable delay element coupled to said sampling frequency selecting means for delaying signals provided by said first filter by an amount of time, $T_D$, which may be represented by the equation $T_D = K_2\tau + PK_1\tau$, wherein $\tau$ is a predetermined time period, $K_2$ is a predetermined integer value greater than or equal to zero, $K_1$ is a predetermined integer value greater than zero and P is greater than or equal to zero and is determined by the sampling frequency selecting means, said variable delay element including:

a first delay element for delaying samples provided by said first filter by a predetermined amount of time, first signal switching means coupled to said first filter and to said first delay element and being controlled by a first control signal to selectively provide the delayed samples from said first delay element or the undelayed samples from said first filter;

a second delay element for delaying samples provided by said first signal switching means by an amount of time, $K_1$, where N is a positive integer;

second signal switching means coupled to said first signal switching means and to said second delay element and being controlled by a second control signal to selectively provide the samples from said second delay element or the samples provided by said first signal switching means;

means for developing said first control signal from a first bit of the value P; and means for developing said second control signal from a second bit of the value P, said second bit being different from said first bit; and arithmetic circuitry which combines the delayed signals provided by said variable delay element with the signals provided by said first filter to produce signals for application to said further sampled data signal developing means.

4. The adaptive filtering system set forth in claim 3 wherein said variable delay element further comprises:

a third delay element for delaying the samples provided by said second switching means by an amount of time substantially equal to $K_2\tau$ minus any signal propagation delay which may be associated with said first and second signal switching means.

5. In a picture-in-picture television display system for displaying an image developed from a sampled data secondary composite video signal as a reduced-size inset in the image developed from a primary video signal, wherein said sampled data secondary composite video signal includes luminance signal components occupying a predetermined band of frequencies and chrominance signal components, apparatus for processing said secondary video signal comprising:

an input terminal for applying an image compression control signal indicating the ratio by which the secondary image is reduced relative to the primary image;

a first filter responsive to said sampled data secondary composite video signal for attenuating the chrominance signal components thereof relative to the luminance signal components to provide a separated luminance signal;

a second filter coupled to said first filter for attenuating components of said separated luminance signal having frequencies within a selected portion of said predetermined band of frequencies relative to components of said separated luminance signal having frequencies not within the selected portion of said predetermined band of frequencies, including:

a variable delay element for delaying the separated luminance signals provided by said first filter by an amount of time which may be represented by the equation $T_D = K_2\tau + PK_1$, where $\tau$ is a predetermined time period, $K_2$ is a predetermined integer value greater than or equal to zero, $K_1$ is a predetermined integer value greater than zero and P is a digital signal which has values greater than zero, said variable delay element including:

a first delay element for delaying the separated luminance signals provided by said first filter by a predetermined amount of time, $K_1\tau$;

first signal switching means coupled to said first filter and to said first delay element and being controlled by a first control signal to selectively provide one of the signals from said first delay element and the signals provided by said first filter;

a second delay element for delaying the signals provided by said first signal switching means by an amount of time, $2K_1\tau$;

second signal switching means coupled to said first signal switching means and to said second delay element and being controlled by a second control signal to selectively provide one of the signals from said second delay element and the signals provided by said first signal switching means;

means for developing said first control signal from the least significant bit of the digital signal P; and means for developing said second control signal from the bit of the digital signal P which is the next more significant bit than the least significant bit;

arithmetic circuitry which combines the signals provided by the variable delay element with the signals provided by said first filter to produce filtered luminance signals; and means coupled to said variable delay element and responsive to said image compression control signal for changing the value of the signal P to define the selected portion of said predetermined band of frequencies.

6. The apparatus set forth in claim 5 wherein said variable delay element further comprises:

a third delay element for delaying the samples provided by said second switching means by an amount of time substantially equal to $K_2\tau$ minus any signal propagation delay which may be associated with said first and second signal switching means.

* * * * *

UNITED STATES PATENT AND TRADEMARK OFFICE
CERTIFICATE OF CORRECTION

PATENT NO. : 4,717,951

DATED : January 5, 1938

INVENTOR(S) : Russell T. Fling

It is certified that error appears in the above-identified patent and that said Letters Patent is hereby corrected as shown below:

Column 11 line 56 insert "$K_1 \tau$;" after "time,"

Column 11 line 64 should read "$NK_1$" instead of "$K_1$"

Signed and Sealed this

Twenty-second Day of November, 1988

Attest:

DONALD J. QUIGG

Attesting Officer     Commissioner of Patents and Trademarks